(12) United States Patent
Xue et al.

(10) Patent No.: US 12,431,504 B2
(45) Date of Patent: Sep. 30, 2025

(54) SILICON-BASED NEGATIVE ELECTRODE SLURRY, PREPARATION METHOD THEREFOR, AND NEGATIVE ELECTRODE PIECE

(71) Applicant: EVE ENERGY CO., LTD., Guangdong (CN)

(72) Inventors: Yang Xue, Guangdong (CN); Shengqi Liu, Guangdong (CN); Pengyuan Song, Guangdong (CN)

(73) Assignee: EVE ENERGY CO., LTD., Guangdong (CN)

( * ) Notice: Subject to any disclaimer, the term of this patent is extended or adjusted under 35 U.S.C. 154(b) by 0 days.

(21) Appl. No.: 18/852,680

(22) PCT Filed: Mar. 1, 2024

(86) PCT No.: PCT/CN2024/079545
§ 371 (c)(1),
(2) Date: Jan. 8, 2025

(87) PCT Pub. No.: WO2024/153262
PCT Pub. Date: Jul. 25, 2024

(65) Prior Publication Data
US 2025/0167237 A1    May 22, 2025

(30) Foreign Application Priority Data
Mar. 31, 2023 (CN) .......................... 202310336537.4

(51) Int. Cl.
| | | |
|---|---|---|
| *H01M 4/62* | (2006.01) | |
| *B01F 23/50* | (2022.01) | |
| *B01F 23/53* | (2022.01) | |
| *B01F 27/232* | (2022.01) | |
| *H01M 4/04* | (2006.01) | |
| *H01M 4/38* | (2006.01) | |

(52) U.S. Cl.
CPC .......... *H01M 4/622* (2013.01); *B01F 23/511* (2022.01); *B01F 23/53* (2022.01); *B01F 27/2324* (2022.01); *H01M 4/04* (2013.01); *H01M 4/386* (2013.01); *B01F 2215/044* (2013.01); *B01F 2215/0477* (2013.01); *B01F 2215/0481* (2013.01); *B01F 2215/0495* (2013.01)

(58) Field of Classification Search
CPC ................ B01F 23/511; B01F 27/2324; B01F 2215/044
See application file for complete search history.

(56) References Cited

U.S. PATENT DOCUMENTS

2019/0260011 A1    8/2019  Ho et al.

FOREIGN PATENT DOCUMENTS

| | | | | |
|---|---|---|---|---|
| CN | 106058259 A | | 10/2016 | |
| CN | 109192923 A | * | 1/2019 | ............ H01M 4/139 |
| CN | 109888170 A | | 6/2019 | |
| CN | 114242992 A | | 3/2022 | |
| CN | 114388748 A | | 4/2022 | |
| CN | 115000407 A | | 9/2022 | |
| CN | 115360350 A | | 11/2022 | |
| CN | 115548343 A | | 12/2022 | |
| CN | 115566179 A | | 1/2023 | |
| CN | 116230849 A | | 6/2023 | |
| JP | 2019125468 A | | 7/2019 | |

OTHER PUBLICATIONS

Patent Cooperation Treaty (PCT), International Search Report and Written Opinion for PCT/CN2024/079545 filed on Mar. 1, 2024, mailed May 15, 2024, International Searching Authority, CN.
Extended European Search Report dated Mar. 19, 2025; European Patent Application No. 24744431.8. 48 pages.

* cited by examiner

*Primary Examiner* — Khanh T Nguyen
(74) *Attorney, Agent, or Firm* — McDonald Hopkins LLC

(57) ABSTRACT

The present application relates to a silicon-based negative electrode slurry, a preparation method therefor and a negative electrode piece. The preparation method comprises: (1) mixing CMC and a solvent to obtain a primary adhesive solution; (2) mixing PAA, a silicon-based negative electrode material, a conductive agent, a solvent, and the obtained adhesive solution, then performing double planetary mixing to obtain a secondary glue solution; (3) mixing a solvent and the obtained secondary adhesive solution to obtain a coarse slurry; and (4) mixing the SBR and the obtained coarse slurry to obtain a silicon-based negative electrode slurry. In the homogenization method of the present application, after the PAA and the SBR are incorporated in separate steps, a three-dimensional cross-linked network can be formed, good tensile behavior is exhibited, a bonding effect is improved, same can adapt well to volumetric expansion of silicon negative electrodes, and the cycling stability of silicon negative electrodes is improved.

20 Claims, No Drawings

SILICON-BASED NEGATIVE ELECTRODE SLURRY, PREPARATION METHOD THEREFOR, AND NEGATIVE ELECTRODE PIECE

CROSS-REFERENCES TO RELATED APPLICATIONS

This application is a national stage application filed under 35 U.S.C. 371 based on International Application No. PCT/CN2024/079545 filed on Mar. 1, 2024, which claims priority to Chinese Patent Application No. 202310336537.4 filed to CNIPA on Mar. 31, 2023, the disclosure of which are incorporated herein by reference in their entireties.

TECHNICAL FIELD

The present application belongs to the technical field of manufacturing silicon-based negative electrode sheets, and relates to a silicon-based negative electrode slurry and a preparation method therefor, and a negative electrode sheet.

BACKGROUND

Most negative electrode systems use the conventional graphite negative electrode materials which have excellent safety performance but extremely low theoretical specific capacity (370 mAh/g). The silicon negative electrode has the advantages such as ultra-high theoretical specific capacity (4200 mAh/g), relatively high discharge potential, environmental friendliness, abundant resources, and low price, which has been a research focus in recent years. In order to reduce the effect of volume expansion caused by the reaction of silicon-lithium alloy, extensive research has been conducted. The vast majority of researches focus on the synthesis of silicon-nanostructured materials, but such researches have shortcomings such as high cost and complex process.

The binder as a "bridge" substance that effectively adheres active materials and conductive agents to current collectors is excellent at maintaining the structural integrity of the silicon electrode, which thereby plays a crucial role in controlling the electrochemical performance of lithium-ion batteries.

CN110350196A provides a composite binder, a silicon-based negative electrode sheet and a preparation method therefor. The preparation method for the silicon-based negative electrode sheet comprises: mixing polyvinylidene fluoride of different molecular weights through a ball mill to obtain a composite binder; dissolving the composite binder in an organic solvent to obtain a binder liquid; dispersing a conductive agent in the binder liquid to obtain a conductive binder liquid; adding silicon-carbon composite material powder and an organic solvent to the conductive binder liquid to obtain an electrode slurry; coating the electrode slurry on a negative electrode current collector, and subjecting the obtained current collector coated with the electrode slurry to solvent-removal treatment under high temperature in vacuum; and subjecting the obtained negative electrode sheet to roller-pressing to obtain the silicon-based negative electrode sheet. The prepared silicon-based negative electrode sheet can effectively improve the performance of the electrode materials of the lithium-ion batteries, and improve the rate capability and cycle life of the batteries.

CN110247017A provides a silicon-based negative electrode binder of the lithium-ion battery, a silicon-based negative electrode of the lithium-ion battery and a preparation method therefor, and a lithium-ion battery. The binder comprises a silane coupling agent or a composition of a silane coupling agent and an aqueous binder. The silicon-based negative electrode of the lithium-ion battery comprises a silicon-based material, a conductive additive, a graphite material, and a binder. The preparation method for the silicon-based negative electrode is to add water to raw materials to prepare a slurry, coat the slurry on a current collector, and dry the current collector to obtain the silicon-based negative electrode. The lithium-ion battery comprises the silicon-based negative electrode of the lithium-ion battery. The silane coupling agent can maintain effective contact with the silicon particles via its hydroxyl group forming a certain chemical bond with the silicon particles, and also form a weak chemical bond with the copper foil current collector, resulting in good adhesion between silicon particles and the copper foil. Therefore, the binder has good adhesion and a certain flexibility, which can inhibit the volume change of the electrode sheet to certain extent during the cycle process, and can effectively maintain the adhesion between the active material and the current collector.

The composite binders in the above technical solutions still have relatively complex preparation methods, and technological development is still needed for practical production applications. Moreover, the improvement effect of the binder is not comparable to the investment in development.

Therefore, how to propose a simple preparation method for slurry to inhibit the expansion of silicon-based materials and improve cycle performance of negative electrodes is an urgent problem to be solved in the technical field of lithium-ion battery negative electrode sheets.

SUMMARY

The following is a brief summary of the subject matter that is described in detail herein. This summary is not intended to be limiting as to the scope of the claims.

To solve the above technical problems, the present application provides a silicon-based negative electrode slurry and a preparation method therefor, and a negative electrode sheet. In the slurry-homogenizing method of the present application, by combining PAA and SBR in a step-by-step manner, a three-dimensional crosslinked network can be formed, which shows a good tensile property, improves the bonding effect, can be well adapted to the volume expansion of the silicon negative electrode, and improves the cycle stability of the silicon negative electrode.

To achieve this object, the present application uses the following technical solutions.

The present application provides a preparation method for a silicon-based negative electrode slurry, and the preparation method comprises:
(1) mixing sodium carboxymethyl cellulose (CMC) and a solvent to obtain a primary binder liquid;
(2) mixing polyacrylic acid (PAA), a silicon-based negative electrode material, a conductive agent, a solvent, and the obtained binder liquid, and performing double-planetary stirring to obtain a secondary binder liquid;
(3) mixing a solvent and the obtained secondary binder liquid to obtain a crude slurry; and
(4) mixing styrene butadiene rubber (SBR) and the obtained crude slurry to obtain the silicon-based negative electrode slurry.

In the slurry-homogenizing method of the present application, by combining PAA and SBR in a step-by-step manner, a three-dimensional crosslinked network can be formed, which shows a good tensile property, and can improve the bonding effect, be well adapted to the volume expansion of the silicon negative electrode, and improve the cycle stability of the silicon negative electrode.

PAA is a water-soluble polymer with high strength, high toughness, and extremely strong adhesion, which can be partially and chemically cross-linked at high temperatures with its large amount of carboxyl groups or with other auxiliary polymers, such as hydroxyl groups on sodium carboxymethyl cellulose (CMC), so as to improve the cycle performance of the silicon negative electrode.

A total solvent for preparing the silicon-based negative electrode slurry in the present application is divided into a first solvent, a second solvent, and a third solvent, and the total solvent is divided into three portions according to different masses, which are used in step (1), step (2), and step (3) respectively. The first solvent, the second solvent, and the third solvent are the same type of solvent.

In one embodiment, the first solvent, the second solvent, and the third solvent are water.

The aqueous slurry is employed, and the water solvent is added by three times with controlled amounts, so as to achieve the effect that the viscosity and solid content of the slurry meet the standard, the particle size and the fineness both meet the requirements, and the slurry is uniformly mixed without suspended particles and insoluble matter.

In one embodiment, a mass of the first solvent in step (1) is 35-40 wt % of the total amount of the solvents in the silicon-based negative electrode slurry, which may be, for example, 35 wt %, 36 wt %, 37 wt %, 38 wt %, 39 wt %, or 40 wt %; however, the mass is not limited to the listed values, and other unlisted values within the numerical range can also be applicable.

In one embodiment, a mass of the second solvent in step (2) is 55-65 wt % of the total amount of the solvents in the silicon-based negative electrode slurry, which may be, for example, 55 wt %, 57 wt %, 60 wt %, 62 wt %, or 65 wt %; however, the mass is not limited to the listed values, and other unlisted values within the numerical range can also be applicable.

In one embodiment, a mass of the third solvent in step (3) is 1-3 wt % of the total amount of the solvents in the silicon-based negative electrode slurry, which may be, for example, 1 wt %, 1.5 wt %, 2 wt %, 2.5 wt %, or 3 wt %; however, the mass is not limited to the listed values, and other unlisted values within the numerical range can also be applicable.

In one embodiment, a solid content of the primary binder liquid in step (1) is 1-2%, which may be, for example, 1%, 1.2%, 1.4%, 1.8%, or 2%; however, the solid content is not limited to the listed values, and other unlisted values within the numerical range can also be applicable.

In one embodiment, a mass of the CMC in step (1) is 0.1-0.5 wt % of the mass of non-solvent materials of the silicon-based negative electrode slurry, which may be, for example, 0.1 wt %, 0.2 wt %, 0.3 wt %, 0.4 wt %, or 0.5 wt %; however, the mass is not limited to the listed values, and other unlisted values within the numerical range can also be applicable.

In one embodiment, a mass of the PAA in step (2) is 1-1.5 wt % of the mass of non-solvent materials of the silicon-based negative electrode slurry, which may be, for example, 1 wt %, 1.1 wt %, 1.2 wt %, 1.3 wt %, 1.4 wt %, or 1.5 wt %; however, the mass is not limited to the listed values, and other unlisted values within the numerical range can also be applicable.

In one embodiment, the silicon-based negative electrode material in step (2) comprises graphite and silicon-carbon.

In one embodiment, a mass of the silicon-based negative electrode material in step (2) is 96-97 wt % of the mass of non-solvent materials of the silicon-based negative electrode slurry, which may be, for example, 96 wt %, 96.2 wt %, 96.4 wt %, 96.6 wt %, 96.8 wt %, or 97 wt %; however, the mass is not limited to the listed values, and other unlisted values within the numerical range can also be applicable.

The conductive agent in step (2) is any conventional conductive agent.

In one embodiment, a mass of the conductive agent in step (2) is 0.5-1.5 wt % of the mass of non-solvent materials of the silicon-based negative electrode slurry, which may be, for example, 0.5 wt %, 0.8 wt %, 1 wt %, 1.2 wt %, or 1.5 wt %; however, the mass is not limited to the listed values, and other unlisted values within the numerical range can also be applicable.

In one embodiment, a mass of the SBR in step (4) is 1-2 wt % of the mass of non-solvent materials of the silicon-based negative electrode slurry, which may be, for example, 1 wt %, 1.2 wt %, 1.4 wt %, 1.6 wt %, 1.8 wt %, or 2 wt %; however, the mass is not limited to the listed values, and other unlisted values within the numerical range can also be applicable.

In one embodiment, the process of the double-planetary stirring in step (2) comprises low-speed stirring first, followed by medium-speed stirring.

In the present application, the arrangement of low-speed stirring first followed by medium-speed stirring makes the solution uniform without sedimentation and stratification.

In one embodiment, the low-speed stirring is performed at a revolution speed of 20-30 rpm, which may be, for example, 20 rpm, 22 rpm, 24 rpm, 26 rpm, 28 rpm, or 30 rpm, and a rotation speed of 100-300 rpm, which may be, for example, 100 rpm, 150 rpm, 200 rpm, 250 rpm, or 300 rpm; however, the speed is not limited to the listed values, and other unlisted values within the numerical range can also be applicable.

In one embodiment, the low-speed stirring is performed for a period of 10-30 min, which may be, for example, 10 min, 15 min, 20 min, 25 min, or 30 min; however, the period is not limited to the listed values, and other unlisted values within the numerical range can also be applicable.

In one embodiment, the medium-speed stirring is performed at a revolution speed of 15-25 rpm, which may be, for example, 15 rpm, 18 rpm, 20 rpm, 22 rpm, or 25 rpm, and a rotation speed of 1500-2000 rpm, which may be, for example, 1500 rpm, 1600 rpm, 1700 rpm, 1800 rpm, or 2000 rpm; however, the speed is not limited to the listed values, and other unlisted values within the numerical range can also be applicable.

In one embodiment, the medium-speed stirring is performed for a period of 80-100 min, which may be, for example, 80 min, 85 min, 90 min, 95 min, or 100 min; however, the period is not limited to the listed values, and other unlisted values within the numerical range can also be applicable.

In one embodiment, stirring is further comprised after the mixing in step (3).

In one embodiment, the stirring is performed at a revolution speed of 20-30 rpm, which may be, for example, 20 rpm, 22 rpm, 24 rpm, 26 rpm, 28 rpm, or 30 rpm, and a rotation speed of 100-300 rpm, which may be, for example, 100 rpm, 150 rpm, 200 rpm, 250 rpm, or 300 rpm; however, the speed is not limited to the listed values, and other unlisted values within the numerical range can be also applicable.

In one embodiment, the stirring is performed for a period of 80-100 min, which may be, for example, 80 min, 85 min, 90 min, 95 min, or 100 min; however, the period is not limited to the listed values, and other unlisted values within the numerical range can also be applicable.

In one embodiment, kneading is further comprised after the stirring.

In one embodiment, the crude slurry in step (3) has a solid content of 50-55%, which may be, for example, 50%, 51%, 52%, 53%, 54%, or 55%; however, the solid content is not limited to the listed values, and other unlisted values within the numerical range can also be applicable.

In one embodiment, the crude slurry in step (3) has a viscosity of 3500-4500 mPa·s, which may be, for example, 3500 mPa·s, 3800 mPa·s, 4000 mPa·s, 4200 mPa·s, or 4500 mPa·s; however, the viscosity is not limited to the listed values, and other unlisted values within the numerical range can also be applicable.

In one embodiment, the SBR in step (4) is an SBR dispersing solution.

In one embodiment, the SBR dispersing solution has a mass concentration of 35-45 wt %, which may be, for example, 35%, 38%, 40%, 42%, or 45%; however, the mass concentration is not limited to the listed values, and other unlisted values within the numerical range can also be applicable.

In one embodiment, vacuuming and double-planetary stirring are further comprised after the mixing in step (4).

In one embodiment, the double-planetary stirring is performed for a period of 20-40 min, which may be, for example, 20 min, 25 min, 30 min, 35 min, or 40 min; however, the period is not limited to the listed values, and other unlisted values within the numerical range can also be applicable.

In one embodiment, the double-planetary stirring is performed at a revolution speed of 20-30 rpm, which may be, for example, 20 rpm, 22 rpm, 24 rpm, 26 rpm, 28 rpm, or 30 rpm, and a rotation speed of 700-900 rpm, which may be, for example, 700 rpm, 750 rpm, 800 rpm, 850 rpm, or 900 rpm; however, the speed is not limited to the listed values, and other unlisted values within the numerical range can also be applicable.

In one embodiment, the silicon-based negative electrode slurry obtained in step (4) is stored under vacuum.

As an optional technical solution of the preparation method in the first aspect of the present application, the preparation method comprises:

(1) dividing solvent water which is required for preparing the silicon-based negative electrode slurry into a first solvent, a second solvent, and a third solvent, wherein a mass of the first solvent is 35-40 wt % of the total mass of the solvent water, a mass of the second solvent is 55-65 wt % of the total mass of the solvent water, and a mass of the third solvent is 1-3 wt % of the total mass of the solvent water; mixing CMC and the first solvent to obtain a primary binder liquid with a solid content of 1-2%; the mass of the CMC is 0.1-0.5 wt % of the mass of non-solvent materials of the silicon-based negative electrode slurry;

(2) mixing PAA, a silicon-based negative electrode material, a conductive agent, the second solvent, and the obtained binder liquid according to a formula amount, and performing double-planetary stirring, which comprises first performing low-speed stirring at a revolution speed of 20-30 rpm and a rotation speed of 100-300 rpm for 10-30 min, and then performing medium-speed stirring at a revolution speed of 15-25 rpm and a rotation speed of 1500-2000 rpm for 80-100 min to obtain a secondary binder liquid; a mass of the PAA is 1-1.5 wt % of the mass of non-solvent materials of the silicon-based negative electrode slurry; a mass of non-solvent materials of the silicon-based negative electrode material is 96-97 wt % of the mass of non-solvent materials of the silicon-based negative electrode slurry; and a mass of the conductive agent is 0.5-1.5 wt % of the mass of non-solvent materials of the silicon-based negative electrode slurry;

(3) mixing the third solvent and the obtained secondary binder liquid, stirring at a revolution speed of 20-30 rpm and a rotation speed of 100-300 rpm for 80-100 min, and then kneading to obtain a crude slurry with a solid content of 50-55% and a viscosity of 3500-4500 mPa·s; and (4) mixing an SBR dispersing solution with a mass concentration of 35-45 wt % and the obtained crude slurry, vacuumizing and performing double-planetary stirring for 20-40 min to obtain the silicon-based negative electrode slurry; a mass of the SBR is 1-2 wt % of the mass of non-solvent materials of the silicon-based negative electrode slurry.

In a second aspect, the present application provides a silicon-based negative electrode slurry, and the silicon-based negative electrode slurry is prepared by the preparation method according to the first aspect.

In one embodiment, the silicon-based negative electrode slurry has a solid content of 50-55%, which may be, for example, 50%, 51%, 52%, 53%, 54%, or 55%; however, the solid content is not limited to the listed values, and other unlisted values within the numerical range can also be applicable.

In one embodiment, the silicon-based negative electrode slurry has a viscosity of 2500-4500 cp, which may be, for example, 2500 cp, 3000 cp, 3500 cp, 4000 cp, or 4500 cp; however, the viscosity is not limited to the listed values, and other unlisted values within the numerical range can also be applicable.

In a third aspect, the present application provides a negative electrode sheet, wherein the negative electrode sheet is prepared using the silicon-based negative electrode slurry according to the second aspect.

Compared to the related technology, the present application has at least the following beneficial effects.

In the slurry-homogenizing method of the present application, by combining PAA and SBR in a step-by-step manner, a three-dimensional crosslinked network can be formed, which shows a good tensile property, and can improve the bonding effect, be well adapted to the volume expansion of the silicon negative electrode, and improve the cycle stability of the silicon negative electrode.

Other aspects will be appreciated upon reading and understanding the detailed description.

DETAILED DESCRIPTION

Example 1

This example provides a preparation method for a silicon-based negative electrode slurry, and the preparation method comprises:

(1) solvent water which was required for preparing the silicon-based negative electrode slurry was divided into a first solvent, a second solvent, and a third solvent, wherein a mass of the first solvent was 38 wt % of the total mass of the solvent water, a mass of the second solvent was 60 wt % of the total mass of the solvent water, and a mass of the third solvent was 2 wt % of the total mass of the solvent water; CMC and the first solvent were mixed to obtain a primary binder liquid with a solid content of 2%; a mass of the CMC was 0.3 wt % of the mass of non-solvent materials of the silicon-based negative electrode slurry;

(2) PAA, a silicon-based negative electrode material, conductive carbon nano-tubes, the second solvent, and the obtained binder liquid were mixed according to a formula amount and subjected to double-planetary stirring, wherein low-speed stirring was first performed at a revolution speed of 25 rpm and a rotation speed of 200 rpm for 30 min, and then medium-speed stirring was performed at a revolution speed of 20 rpm and a rotation speed of 1800 rpm for 100 min, so as to obtain a secondary binder liquid; a mass of the PAA was 1.1 wt % of the mass of non-solvent materials of the silicon-based negative electrode slurry; a mass of non-solvent materials of the silicon-based negative electrode material was 96.1 wt % of the mass of the silicon-based negative electrode slurry; and a mass of the conductive agent was 1 wt % of the mass of non-solvent materials of the silicon-based negative electrode slurry;

(3) the third solvent and the obtained secondary binder liquid were mixed, stirred at a revolution speed of 25 rpm and a rotation speed of 200 rpm for 100 min, and then kneaded to obtain a crude slurry with a solid content of 50% and a viscosity of 3500 mPa·s; and (4) an SBR dispersing solution with a mass concentration of 40 wt % and the obtained crude slurry were mixed, vacuumized and then subjected to double-planetary stirring at a revolution speed of 25 rpm and a rotation speed of 800 rpm for 40 min to obtain the silicon-based negative electrode slurry; a mass of the SBR was 1.5 wt % of the mass of non-solvent materials of the silicon-based negative electrode slurry.

Example 2

This example provides a preparation method for a silicon-based negative electrode slurry, and the preparation method comprises:

(1) solvent water which was required for preparing the silicon-based negative electrode slurry was divided into a first solvent, a second solvent, and a third solvent, wherein a mass of the first solvent was 35 wt % of the total mass of the solvent water, a mass of the second solvent was 64 wt % of the total mass of the solvent water, and a mass of the third solvent was 1 wt % of the total mass of the solvent water; CMC and the first solvent were mixed to obtain a primary binder liquid with a solid content of 1.5%; a mass of the CMC was 0.1 wt % of the mass of non-solvent materials of the silicon-based negative electrode slurry;

(2) PAA, a silicon-based negative electrode material, carbon black, the second solvent, and the obtained binder liquid were mixed according to a formula amount and subjected to double-planetary stirring, wherein low-speed stirring was first performed at a revolution speed of 20 rpm and a rotation speed of 100 rpm for 20 min, and then medium-speed stirring was performed at a revolution speed of 25 rpm and a rotation speed of 2000 rpm for 90 min, so as to obtain a secondary binder liquid; a mass of the PAA was 1 wt % of the mass of non-solvent materials of the silicon-based negative electrode slurry; a mass of the non-solvent materials of silicon-based negative electrode material was 96 wt % of the mass of the non-solvent materials of silicon-based negative electrode slurry; and a mass of the conductive agent was 0.5 wt % of the mass of non-solvent materials of the silicon-based negative electrode slurry;

(3) the third solvent and the obtained secondary binder liquid were mixed, stirred at a revolution speed of 20 rpm and a rotation speed of 100 rpm for 90 min, and then kneaded to obtain a crude slurry with a solid content of 52% and a viscosity of 4000 mPa·s; and (4) an SBR dispersing solution with a mass concentration of 35 wt % and the obtained crude slurry were mixed, vacuumized and then subjected to double-planetary stirring at a revolution speed of 20 rpm and a rotation speed of 700 rpm for 30 min to obtain the silicon-based negative electrode slurry; a mass of the SBR was 1 wt % of the mass of non-solvent materials of the silicon-based negative electrode slurry.

Example 3

This example provides a preparation method for a silicon-based negative electrode slurry, and the preparation method comprises:

(1) solvent water which was required for preparing the silicon-based negative electrode slurry was divided into a first solvent, a second solvent, and a third solvent, wherein a mass of the first solvent was 40 wt % of the total mass of the solvent water, a mass of the second solvent was 57 wt % of the total mass of the solvent water, and a mass of the third solvent was 3 wt % of the total mass of the solvent water; CMC and the first solvent were mixed to obtain a primary binder liquid with a solid content of 1%; a mass of the CMC was 0.5 wt % of the mass of non-solvent materials of the silicon-based negative electrode slurry;

(2) PAA, a silicon-based negative electrode material, carbon nano-tubes, the second solvent, and the obtained binder liquid were mixed according to a formula amount and subjected to double-planetary stirring, wherein low-speed stirring was first performed at a revolution speed of 30 rpm and a rotation speed of 300 rpm for 10 min, and then medium-speed stirring was performed at a revolution speed of 25 rpm and a rotation speed of 2000 rpm for 80 min, so as to obtain a secondary binder liquid; a mass of the PAA was 1.5 wt % of the mass of non-solvent materials of the silicon-based negative electrode slurry; a mass of non-solvent materials of the silicon-based negative electrode material was 96 wt % of the mass of non-solvent materials of the silicon-based negative electrode slurry; and a mass of the conductive agent was 0.5 wt % of the mass of non-solvent materials of the silicon-based negative electrode slurry;

(3) the solvent and the obtained secondary binder liquid were mixed, stirred at a revolution speed of 30 rpm and a rotation speed of 300 rpm for 80 min, and then kneaded to obtain a crude slurry with a solid content of 55% and a viscosity of 4500 mPa·s; and (4) an SBR dispersing solution with a mass concentration of 45 wt % and the obtained crude slurry were mixed, vacuumized and then subjected to double-planetary stirring at a revolution speed of 30 rpm and a rotation speed of 900 rpm for 20 min to obtain the silicon-based negative electrode slurry; a mass of the SBR was 1 wt % of the mass of non-solvent materials of the silicon-based negative electrode slurry.

Example 4

This example provides a preparation method for a silicon-based negative electrode slurry, which differs from Example 1 in that a solid content of the primary binder liquid in step (1) was 3%.

Example 5

This example provides a preparation method for a silicon-based negative electrode slurry, which differs from Example 1 in that a solid content of the primary binder liquid in step (1) was 0.5%.

Example 6

This example provides a preparation method for a silicon-based negative electrode slurry, which differs from Example 1 in that the low-speed stirring of the double-planetary stirring in step (2) was not performed.

Example 7

This example provides a preparation method for a silicon-based negative electrode slurry, which differs from Example 1 in that the medium-speed stirring of the double-planetary stirring in step (2) was not performed.

Example 8

This example provides a preparation method for a silicon-based negative electrode slurry, which differs from Example 1 in that a solid content of the crude slurry in step (3) was 45%.

Example 9

This example provides a preparation method for a silicon-based negative electrode slurry, which differs from Example 1 in that a solid content of the crude slurry in step (3) was 60%.

Example 10

This example provides a preparation method for a silicon-based negative electrode slurry, which differs from Example 1 in that a viscosity of the crude slurry in step (3) was 3000 mPa·s.

Example 11

This example provides a preparation method for a silicon-based negative electrode slurry, which differs from Example 1 in that a viscosity of the crude slurry in step (3) was 4000 mPa·s.

Example 12

This example provides a preparation method for a silicon-based negative electrode slurry, which differs from Example 1 in that the SBR dispersing solution in step (4) was replaced by solid SBR.

Example 13

This example provides a preparation method for a silicon-based negative electrode slurry, which differs from Example 1 in that a mass of the solvent in step (1) was 50 wt % of the total amount of the solvents in the silicon-based negative electrode slurry, a mass of the solvent in step (2) was 40 wt % of the total amount of the solvents in the silicon-based negative electrode slurry, and a mass of the solvent in step (3) was 10 wt % of the total amount of the solvents in the silicon-based negative electrode slurry.

Comparative Example 1

This comparative example provides a preparation method for a silicon-based negative electrode slurry, which differs from Example 1 in that the CMC in step (1) was replaced by PAA with an equal mass, and the PAA in step (2) was replaced by CMC with an equal mass.

Comparative Example 2

This comparative example provides a preparation method for a silicon-based negative electrode slurry, which differs from Example 1 in that the CMC in step (1) was replaced by PAA with an equal mass, the PAA in step (2) was replaced by CMC with an equal mass, and the low-speed stirring of the double-planetary stirring in step (2) was not performed.

Comparative Example 3

This comparative example provides a preparation method for a silicon-based negative electrode slurry, which differs from Example 1 in that the CMC in step (1) was replaced by PAA with an equal mass, the PAA in step (2) was replaced by CMC with an equal mass, and the medium-speed stirring of the double-planetary stirring in step (2) was not performed.

Comparative Example 4

This comparative example provides a preparation method for a silicon-based negative electrode slurry, which differs from Example 1 in that the SBR dispersing solution in step (4) was replaced by a PAA dispersing solution with an equal mass.

Comparative Example 5

This comparative example provides a preparation method for a silicon-based negative electrode slurry, which differs from Example 1 in that the mixing with water in step (2) and step (3) was performed in step (1).

The above obtained silicon-based negative electrode slurries were coated on a current collector to prepare negative electrode sheets, and assembled into lithium-ion batteries with positive electrode sheets of ternary material (NCM111) as the positive electrode material. Testing the lithium-ion batteries and the test results are shown in Table 1.

TABLE 1

| Test No. | Volume expansion rate | Cycle performance | Rate capability |
| --- | --- | --- | --- |
| Example 1 | 0.24% | 6A-70A cycle 92% @400 cyc. | 50A: ≥75% $C_N$ |
| Example 2 | 0.43% | 6A-70A cycle 89% @400 cyc. | 50A: ≥70% $C_N$ |
| Example 3 | 0.57% | 6A-70A cycle 90% @400 cyc. | 50A: ≥70% $C_N$ |

TABLE 1-continued

| Test No. | Volume expansion rate | Cycle performance | Rate capability |
|---|---|---|---|
| Example 4 | 3.7% | 6A-70A cycle 70% @400 cyc. | 50A: ≥65% $C_N$ |
| Example 5 | 2.6% | 6A-70A cycle 72% @400 cyc. | 50A: ≥70% $C_N$ |
| Example 6 | 1.7% | 6A-70A cycle 62% @300 cyc. | 50A: ≥60% $C_N$ |
| Example 7 | 2.3% | 6A-70A cycle 57% @300 cyc. | 50A: ≥58% $C_N$ |
| Example 8 | 5.8% | 6A-70A cycle 300 cyc. plunge | 50A: ≥45% $C_N$ |
| Example 9 | 6.1% | 6A-70A cycle 300 cyc. plunge | 50A: ≥41% $C_N$ |
| Example 10 | 7.1% | 6A-70A cycle 300 cyc. plunge | 50A: ≥40% $C_N$ |
| Example 11 | 6.8% | 6A-70A cycle 300 cyc. plunge | 50A: ≥42% $C_N$ |
| Example 12 | 4.3% | 6A-70A cycle 72% @400 cyc. | 50A: ≥65% $C_N$ |
| Example 13 | | Failed to be kneaded together | |
| Comparative Example 1 | 0.7% | 6A-70A cycle 83% @400 cyc. | 50A: ≥70% $C_N$ |
| Comparative Example 2 | 2.7% | 6A-70A cycle 55% @300 cyc. | 50A: ≥45% $C_N$ |
| Comparative Example 3 | 3.3% | 6A-70A cycle 50% @300 cyc. | 50A: ≥40% $C_N$ |
| Comparative Example 4 | 3.7% | 6A-70A cycle 70% @400 cyc. | 50A: ≥61% $C_N$ |
| Comparative Example 5 | | Unqualified slurry Failed to meet standards for granularity and fineness | |

The following conclusions can be obtained from Table 1.

As can be seen from Examples 1-3, in the slurry-homogenizing method of the present application, by combining PAA and SBR in a step-by-step manner, a three-dimensional crosslinked network can be formed, which shows a good tensile property, and can improve the bonding effect, be well adapted to the volume expansion of the silicon negative electrode, and improve the cycle stability of the silicon negative electrode.

As can be seen from the comparison of Examples 4 and 5 to Example 1, in a case where the solid content of the primary binder liquid is out of the preferred range of the present application, the bonding effect of the homogenized slurry is poor, and the inhibition effect on the expansion of the silicon negative electrode material is poor.

As can be seen from the comparison of Examples 6 and 7 to Example 1, the stirring process of the double-planetary stirring is improved in the present application, so that the secondary binder liquid is mixed thoroughly and evenly, with a good bonding effect, which is conducive to the formation of crosslinked network structure. When the stirring process is changed, the effect of slurry-homogenizing is affected, resulting in poor cycle stability of the battery.

As can be seen from the comparison of Examples 8 and 9 to Example 1, in a case where the solid content of the crude slurry is not within the preferred range of the present application, the bonding effect of the homogenized slurry is poor, and the inhibition effect on the expansion of the silicon negative electrode material is poor.

As can be seen from the comparison of Examples 10 and 11 to Example 1, in a case where the viscosity of the crude slurry is not within the preferred range of the present application, the bonding effect of the homogenized slurry is poor, and the inhibition effect on the expansion of the silicon negative electrode material is poor.

As can be seen from the comparison of Example 12 and Comparative Example 4 to Example 1, the method of mixing the SBR dispersing solution and the PAA crude slurry adopted in the present application improves the bonding effect of the homogenized slurry, and is conducive to inhibiting the expansion of the silicon-based negative electrode in the slurry, and improves the cycle stability.

As can be seen from the comparison of Example 13 and Comparative Example 5 to Example 1, in the present application, the slurry-homogenizing method where the solvent is added sequentially by three steps, with the controlled additive amount of water, is conducive to improving the bonding effect.

As can be seen from the comparison of Comparative Example 1 and Example 1, because PAA is a water-soluble polymer with high strength, high toughness, and extremely strong adhesion, and PAA can use its large number of carboxyl groups to crosslink with itself or with other auxiliary polymers, by controlling the feeding sequence of PAA and CMC, the carboxyl groups on PAA undergo crosslinking during the feeding process, which further improves the bonding effect of the homogenized slurry, and is conducive to inhibiting the expansion of the silicon-based negative electrode in the slurry, and improves the cycle stability.

As can be seen from the comparison of Examples 6 and 7 and Comparative Examples 2 and 3 to Example 1, in the present application, there is a synergistic effect between the controlling of the feeding sequence of PAA and CMC and the stirring process of the double-planetary stirring, which improves the bonding effect of the homogenized slurry, and is conducive to inhibiting the expansion of the silicon-based negative electrode slurry, and improves the cycle stability.

What is claimed is:

1. A preparation method for a silicon-based negative electrode slurry, which comprises:
    (1) mixing sodium carboxymethyl cellulose (CMC) and a first solvent to obtain a primary binder liquid;
    (2) mixing polyacrylic acid (PAA), a silicon-based negative electrode material, a conductive agent, a second solvent, and the obtained binder liquid, and performing double-planetary stirring to obtain a secondary binder liquid;
    (3) mixing a third solvent and the obtained secondary binder liquid to obtain a crude slurry; and
    (4) mixing styrene butadiene rubber (SBR) and the obtained crude slurry to obtain the silicon-based negative electrode slurry.

2. The preparation method according to claim 1, wherein the first solvent, the second solvent, and the third solvent are water;
    optionally, a mass of the first solvent in step (1) is 35-40 wt % of the total amount of the solvents in the silicon-based negative electrode slurry;
    optionally, a mass of the second solvent in step (2) is 55-65 wt % of the total amount of the solvents in the silicon-based negative electrode slurry;
    optionally, a mass of the third solvent in step (3) is 1-3 wt % of the total amount of the solvents in the silicon-based negative electrode slurry.

3. The preparation method according to claim 2, wherein a mass of the first solvent in step (1) is 35-40 wt % of the total amount of the solvents in the silicon-based negative electrode slurry.

4. The preparation method according to claim 2, wherein a mass of the second solvent in step (2) is 55-65 wt % of the total amount of the solvents in the silicon-based negative electrode slurry.

5. The preparation method according to claim 2, wherein a mass of the third solvent in step (3) is 1-3 wt % of the total amount of the solvents in the silicon-based negative electrode slurry.

6. The preparation method according to claim 1 or 2, wherein a solid content of the primary binder liquid in step (1) is 1-2%;
optionally, a mass of the CMC in step (1) is 0.1-0.5 wt % of the mass of the silicon-based negative electrode slurry;
optionally, a mass of the PAA in step (2) is 1-1.5 wt % of the mass of the silicon-based negative electrode slurry;
optionally, a mass of the silicon-based negative electrode material in step (2) is 96-97 wt % of the mass of the silicon-based negative electrode slurry;
optionally, a mass of the conductive agent in step (2) is 0.5-1.5 wt % of the mass of the silicon-based negative electrode slurry;
optionally, a mass of the SBR in step (4) is 1-2 wt % of the mass of the silicon-based negative electrode slurry.

7. The preparation method according to any one of claims 1-6, wherein the process of the double-planetary stirring in step (2) comprises low-speed stirring first, followed by medium-speed stirring;
1 optionally, the low-speed stirring is performed at a revolution speed of 20-30 rpm and a rotation speed of 100-300 rpm;
optionally, the low-speed stirring is performed for a period of 10-30 min;
optionally, the medium-speed stirring is performed at a revolution speed of 15-25 rpm and a rotation speed of 1500-2000 rpm;
optionally, the medium-speed stirring is performed for a period of 80-100 min.

8. The preparation method according to claim 7, wherein the low-speed stirring is performed at a revolution speed of 20-30 rpm and a rotation speed of 100-300 rpm;
optionally, the low-speed stirring is performed for a period of 10-30 min.

9. The preparation method according to claim 7, wherein the medium-speed stirring is performed at a revolution speed of 15-25 rpm and a rotation speed of 1500-2000 rpm;
optionally, the medium-speed stirring is performed for a period of 80-100 min.

10. The preparation method according to any one of claims 1-7, wherein stirring is further comprised after the mixing in step (3);
optionally, the stirring is performed at a revolution speed of 20-30 rpm and a rotation speed of 100-300 rpm;
optionally, the stirring is performed for a period of 80-100 min;
optionally, kneading is further comprised after the stirring;
optionally, the crude slurry in step (3) has a solid content of 50-55%;
optionally, the crude slurry in step (3) has a viscosity of 3500-4500 mPa·s.

11. The preparation method according to any one of claims 1-10, wherein the SBR in step (4) is an SBR dispersing solution;
optionally, the SBR dispersing solution has a mass concentration of 35-45 wt %;
optionally, vacuuming and double-planetary stirring are further comprised after the mixing in step (4);
optionally, the double-planetary stirring is performed for a period of 20-40 min;
optionally, the double-planetary stirring is performed at a revolution speed of 20-30 rpm and a rotation speed of 700-900 rpm;
optionally, the silicon-based negative electrode slurry obtained in step (4) is stored under vacuum.

12. The preparation method according to any one of claims 1-3, wherein the preparation method comprises:
(1) dividing solvent water which is required for preparing the silicon-based negative electrode slurry into a first solvent, a second solvent, and a third solvent, wherein a mass of the first solvent is 35-40 wt % of the total mass of the solvent water, a mass of the second solvent is 55-65 wt % of the total mass of the solvent water, and a mass of the third solvent is 1-3 wt % of the total mass of the solvent water; mixing CMC and the first solvent to obtain a primary binder liquid with a solid content of 1-2%; a mass of the CMC is 0.1-0.5 wt % of the mass of the silicon-based negative electrode slurry;
2 (2) mixing PAA, a silicon-based negative electrode material, a conductive agent, the second solvent, and the obtained binder liquid according to a formula amount, and performing double-planetary stirring, which comprises first performing low-speed stirring at a revolution speed of 20-30 rpm and a rotation speed of 100-300 rpm for 10-30 min, and then performing medium-speed stirring at a revolution speed of 15-25 rpm and a rotation speed of 1500-2000 rpm for 80-100 min, to obtain a secondary binder liquid; a mass of the PAA is 1-1.5 wt % of the mass of the silicon-based negative electrode slurry; a mass of the silicon-based negative electrode material is 96-97 wt % of the mass of the silicon-based negative electrode slurry; and a mass of the conductive agent is 0.5-1.5 wt % of the mass of the silicon-based negative electrode slurry;
(3) mixing the third solvent and the obtained secondary binder liquid, stirring at a revolution speed of 20-30 rpm and a rotation speed of 100-300 rpm for 80-100 min, and then kneading to obtain a crude slurry with a solid content of 50-55% and a viscosity of 3500-4500 mPa·s; and
(4) mixing an SBR dispersing solution with a mass concentration of 35-45 wt % and the obtained crude slurry, vacuumizing, and performing double-planetary stirring at a revolution speed of 20-30 rpm and a rotation speed of 700-900 rpm for 20-40 min to obtain the silicon-based negative electrode slurry; a mass of the SBR is 1-2 wt % of the mass of the silicon-based negative electrode slurry.

13. A silicon-based negative electrode slurry, which is prepared by the preparation method according to any one of claims 1-12.

14. The silicon-based negative electrode slurry according to claim 13, wherein the silicon-based negative electrode slurry has a solid content of 50-55%;
optionally, the silicon-based negative electrode slurry has a viscosity of 2500-4500 cp.

15. A negative electrode sheet, which is prepared from the silicon-based negative electrode slurry according to claim 13 or 14.

16. The preparation method according to claim 1, wherein a mass of the CMC in step (1) is 0.1-0.5 wt % of the mass of non-solvent materials of the silicon-based negative electrode slurry.

17. The preparation method according to claim 1, wherein a mass of the PAA in step (2) is 1-1.5 wt % of the mass of non-solvent materials of the silicon-based negative electrode slurry.

18. The preparation method according to claim 1, wherein a mass of the silicon-based negative electrode material in step (2) is 96-97 wt % of the mass of non-solvent materials of the silicon-based negative electrode slurry.

19. The preparation method according to claim 1, wherein a mass of the conductive agent in step (2) is 0.5-1.5 wt % of the mass of non-solvent materials of the silicon-based negative electrode slurry.

20. The preparation method according to claim 1, wherein a mass of the SBR in step (4) is 1-2 wt % of the mass of non-solvent materials of the silicon-based negative electrode slurry.

\* \* \* \* \*